Patented Oct. 29, 1935

2,018,942

UNITED STATES PATENT OFFICE 2,018,942

GALVANIC BATTERY

Henry Winder Brownsdon, Moseley, Birmingham, and Richard Chadwick, Heaton Grove, Bradford, England, assignors to Imperial Chemical Industries Limited, a corporation of Great Britain No Drawing. Application May 19, 1933, Serial No. 671,906. In Great Britain May 25, 1932

4 Claims. (Cl. 136—128)

The present invention relates to cups for galvanic batteries made of a malleable zinc-mercury alloy.

Galvanic batteries are commonly made of a container composed of metallic zinc which serves as one electrode, in which the electrolyte, in liquid or paste form, is enclosed together with a suitable electrode, e. g. a carbon rod.

These batteries are commonly known as dry batteries and are used largely for pocket lamps and radio receiving sets. The zinc electrodes of such batteries are generally made by pressing a zinc disc in two or three stages into a cup of the desired dimensions, this process being capable of being done by machinery at very high speed. It is essential that the metal should permit of extensive deformation without cracking—that is to say, it should be malleable—and hitherto it has been customary to use pure zinc for the purpose. During the life of the battery the zinc cup becomes corroded by the chemical and electrochemical action which takes place inside the cup, and in order to render this corrosion less rapid the interior surface of the zinc is usually amalgamated with mercury.

One of the difficulties with the present known dry batteries is early perforation of the zinc cup-shaped electrodes, due to irregular corrosion, which is largely the result of uneven amalgamation. A further disadvantage in the present known method of treating the zinc cups with mercury to decrease the rate of corrosion is that oily lubricants are frequently used during the manufacture of the cups and extreme care must be taken to remove all traces of oil or grease from the inside of the cups before they are amalgamated with mercury. If oil or grease is not completely removed by the degreasing operation, the inner surface of the zinc cup will not be uniformly amalgamated with mercury and the wall of the cup will be rapidly corroded and perforated locally and at those positions where the degreasing is not complete.

According to our invention we overcome the difficulties referred to and we improve the resistance to chemical and electro-chemical attack of the zinc electrode by making it of a homogeneous, malleable zinc-mercury alloy which can be worked into any desired shape. The amalgamation of zinc by mercury renders zinc brittle, but we have found that a homogeneous alloy of zinc with a small quantity, for instance less than 0.5%, of mercury can be pressed into cylindrical cups in the same way as pure zinc without showing the brittleness usually associated with amalgamated zinc.

In the making of the zinc-mercury alloy we prefer to first prepare a rich mercury-zinc alloy by dissolving 25 parts of mercury in 75 parts of zinc and then add the requisite quantity of this rich mercury-zinc alloy to molten zinc so as to give the desired small content of mercury in the final zinc-mercury alloy.

The amount of mercury necessary for producing the desired resistance to corrosion is small and we have found that an alloy of zinc with about 0.2% of mercury is malleable, i. e. it works satisfactorily in the rolling operations and that the alloy is sufficiently ductile to be formed into cylinders or drawn into cups or tubes. This small amount of mercury is sufficient to produce a very marked resistance to corrosion of the electrode in the battery, but smaller or greater amounts of mercury may be used.

For example, a small piece of zinc when immersed in dilute sulfuric acid evolved about 300 cc. of hydrogen in about ten minutes, whereas a similar piece of zinc-mercury alloy containing 0.2% of mercury produced according to our invention and under similar treatment only evolved about 50 cc. of hydrogen in twelve hours. While 0.2% of mercury produces a very marked effect, still smaller quantities may be used, the amount of mercury added being chosen with some regard to the subsequent manufacturing operations necessary in the production of the finished product. If the zinc cylinder is to be built up by soldering, for example, in which case the strip or sheet only requires bending into cylindrical form, a somewhat higher percentage of mercury might be used than if the zinc cylinder is to be produced by cupping and drawing operations which call for considerable ductility in the metal.

Owing to the improved resistance in corrosion of a zinc-mercury alloy produced according to our invention, the life of this alloy is greater than that of ordinary zinc, and electrodes made of the zinc-mercury alloy may, therefore, be made of thinner metal than when zinc is used; thus a saving in metal leading to economy in production is possible.

Owing to the homogeneous nature of the zinc-mercury alloy, the mercury is uniformly distributed throughout the metal and such corrosion as takes place does so slowly and quite evenly, which is not the case with amalgamated zinc cups, as the amalgamation is usually uneven due to grease present on the zinc when amalgamation is effected, or for other reasons.

We claim:

1. A pressed cup-shaped container for the electrolyte of a galvanic battery consisting of a homogeneous, malleable zinc-mercury alloy containing less than 0.5% mercury.

2. A pressed battery cup for use in galvanic batteries consisting of a homogeneous, malleable zinc-mercury alloy containing about 0.2% mercury.

3. In a process of making a metallic container for use in a galvanic battery the step comprising shaping into suitable form a homogeneous malleable zinc-mercury alloy containing less than 0.5% mercury.

4. In a process of making a metallic container for use in a galvanic battery the step comprising cupping and drawing to cup shape a homogeneous, malleable zinc-mercury alloy containing less than 0.5% mercury.

HENRY WINDER BROWNSDON.
RICHARD CHADWICK.